US012771706B2

(12) United States Patent
Saxena et al.

(10) Patent No.: US 12,771,706 B2
(45) Date of Patent: Oct. 20, 2026

(54) DETECTING NETWORK ANOMALIES

(71) Applicant: International Business Machines Corporation, Armonk, NY (US)

(72) Inventors: Rajesh Kumar Saxena, Thane West (IN); Harish Bharti, Pune (IN); Ankit Singhal, Meerut (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 18/991,978

(22) Filed: Dec. 23, 2024

(65) Prior Publication Data

US 2026/0181003 A1 Jun. 25, 2026

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC ........................ H04L 63/1425; H04L 63/1441
See application file for complete search history.

(56) References Cited

U.S. PATENT DOCUMENTS

| | | | | |
|---|---|---|---|---|
| 8,141,156 B1 | | 3/2012 | Mao et al. | |
| 12,665,840 B2 | * | 6/2026 | Filsfils | H04L 45/28 |
| 2017/0034721 A1 | * | 2/2017 | Yang | H04W 24/08 |
| 2021/0135982 A1 | * | 5/2021 | Chaturmohta | H04L 43/06 |
| 2022/0027431 A1 | * | 1/2022 | Zheng | G06F 16/9535 |
| 2025/0362990 A1 | * | 11/2025 | Chaturvedi | G06F 11/076 |
| 2026/0046317 A1 | * | 2/2026 | Crabtree | H04L 63/104 |
| 2026/0074947 A1 | * | 3/2026 | Ramadass | H04L 41/0631 |

FOREIGN PATENT DOCUMENTS

| | | | | |
|---|---|---|---|---|
| CN | 116915678 A | | 10/2023 | |
| CN | 121333798 A | * | 1/2026 | G06F 18/213 |

OTHER PUBLICATIONS

Handley, Mark, Vern Paxson, and Christian Kreibich. "Network Intrusion Detection: Evasion, Traffic Normalization, and {End-to-End} Protocol Semantics." 10th USENIX Security Symposium (USENIX Security 01). 2001. (Year: 2001).*

(Continued)

*Primary Examiner* — Michael R Vaughan
(74) *Attorney, Agent, or Firm* — Yee & Associates, P.C.

(57) ABSTRACT

Detecting network anomalies is provided. An amount of change between aggregate representational error data and number of hops data and average travel time data is determined based on comparing the aggregate representational error data that indicate expected network behavior for a network regarding data packet number of hops and average travel time in the network with the number of hops data and the average travel time data that indicate changes in the data packet number of hops and average travel time in the network. It is determined whether the amount of change between the aggregate representational error data and at least one of the number of hops data and the average travel time data is greater than a maximum amount of change threshold level. In response to determining that the amount of change is greater than the maximum amount of change threshold level, an anomaly is detected in the network.

20 Claims, 4 Drawing Sheets

(56) References Cited

OTHER PUBLICATIONS

Menahem, Eitan, et al. "ACTIDS: an active strategy for detecting and localizing network attacks." Proceedings of the 2013 ACM workshop on Artificial intelligence and security. 2013. (Year: 2013).*
Dallas, et al., Hop-Count Monitoring: Detecting Sinkhole Attacks in Wireless Sensor Networks, 15th IEEE International Conference on Networks, Nov. 19-21, 2007, pp. 176-181.
Gargan, R., Traceroute: How to Diagnose & Identity Network Issues, Netmaker, Jun. 26, 2024, 20 pages.
Karlsson, et al., A New MANET Wormhole Detection Algorithm Based on Traversal Time and Hop Count Analysis, Sensors, Sep. 27, 2011, pp. 1122-11140.
Pundir, et al., Designing Efficient Sinkhole Attack Detection Mechanism in Edge-Based loT Deployment, Sensors Jan. 18, 2020, vol. 20, Issue 5, 27 pages.
Santhi, et al, Principal Component Analysis in Routing to Identify the Intrusion by Sequential Hypothesis Testing, International Journal of Engineering and Science, Nov. 2012, vol. 1, Issue 8, pp. 13-19.

* cited by examiner

DETECTING NETWORK ANOMALIES

BACKGROUND

The disclosure relates generally to network security and more specifically to detecting security risks to networks.

Typically, network security consists of the policies and practices adopted to monitor and prevent unauthorized access, misuse, modification, or denial of a network and network-accessible resources. Network security involves the authorization of access to the network and its resources. However, networks are subject to attack by unauthorized or malicious users. Attacks may be passive or active. A passive attack is, for example, when an unauthorized user intercepts data traveling through the network. An active attack is, for example, when an unauthorized user initiates commands to disrupt the network's normal operation or to conduct reconnaissance and lateral movement to find and gain access to resources available via the network.

SUMMARY

According to one illustrative embodiment, a method is provided. The method determines an amount of change between aggregate representational error data for a network and number of hops data and average travel time data based on comparing the aggregate representational error data that indicate expected network behavior for the network regarding data packet number of hops and average travel time in the network with the number of hops data and the average travel time data that indicate any changes in the data packet number of hops and average travel time in the network. The method determines whether the amount of change between the aggregate representational error data for the network and at least one of the number of hops data and the average travel time data is greater than a defined maximum amount of change threshold level. In response to determining that the amount of change between the aggregate representational error data for the network and at least one of the number of hops data and the average travel time data is greater than the defined maximum amount of change threshold level, the method detects that an anomaly exists in the network. According to other illustrative embodiments, a computer system and computer program product are provided.

DETAILED DESCRIPTION

Figure 1:
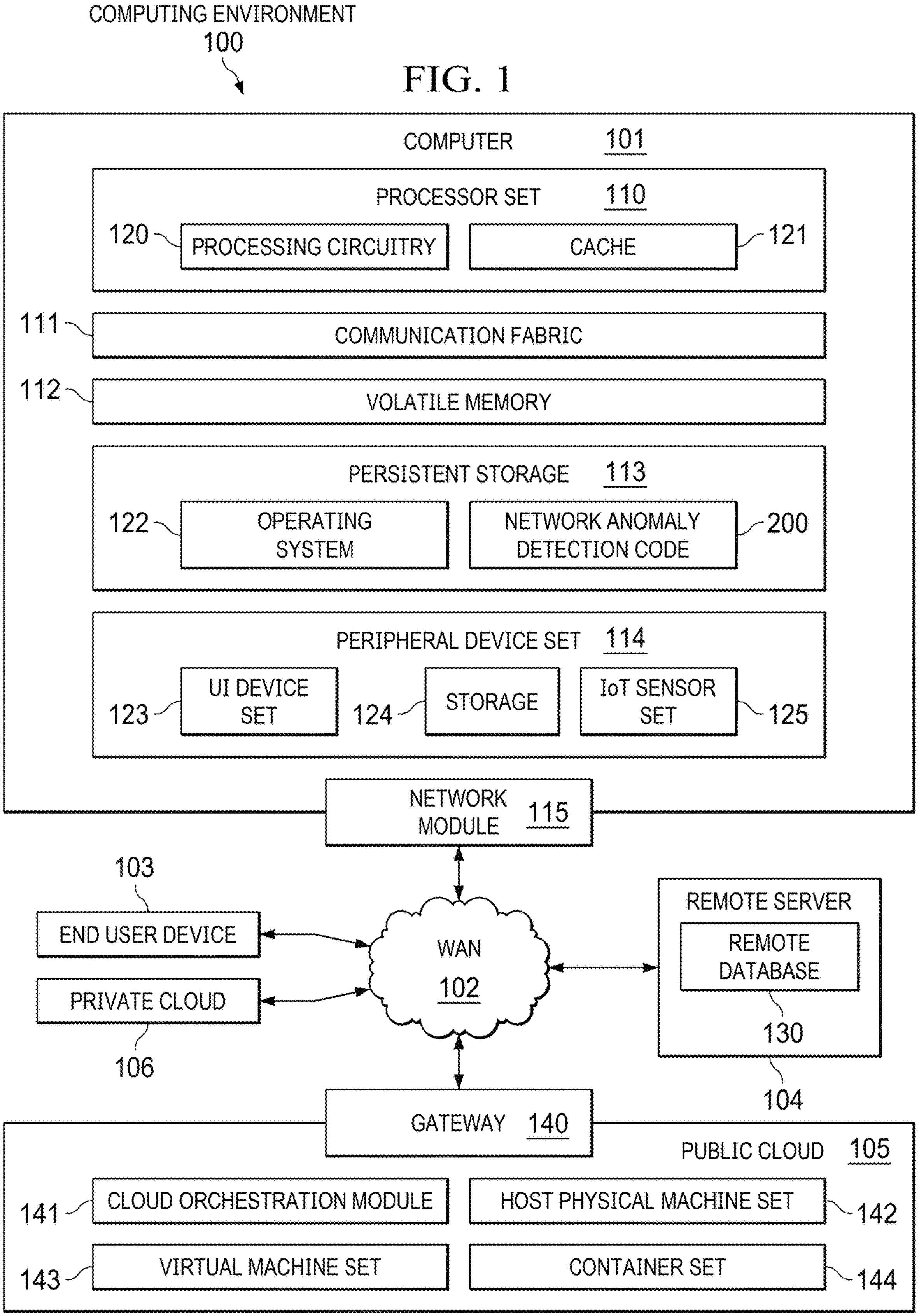
FIG. 1 is a pictorial representation of a computing environment in which illustrative embodiments may be implemented.

A method determines an amount of change between aggregate representational error data for a network and number of hops data and average travel time data based on comparing the aggregate representational error data that indicate expected network behavior for the network regarding data packet number of hops and average travel time in the network with the number of hops data and the average travel time data that indicate any changes in the data packet number of hops and average travel time in the network. The method determines whether the amount of change between the aggregate representational error data for the network and at least one of the number of hops data and the average travel time data is greater than a defined maximum amount of change threshold level. In response to determining that the amount of change between the aggregate representational error data for the network and at least one of the number of hops data and the average travel time data is greater than the defined maximum amount of change threshold level, the method detects that an anomaly exists in the network. As a result, illustrative embodiments provide a technical effect of increasing network security by detecting network anomalies via continually evaluating a network for ever-changing metrics corresponding to number of hops and average travel time that data packets take to traverse the network from source to destination to identify the network anomalies indicating network security risks.

Also, the method determines that there is a security risk to the network based on the anomaly and performs a set of action steps to mitigate the security risk to the network. As a result, illustrative embodiments provide a technical effect of increasing network security by performing a set of action steps to mitigate a security risk to a network caused by a network anomaly.

In addition, the method determines that no anomaly exists in the network in response to determining that the amount of change between the aggregate representational error data for the network and the number of hops data and the average travel time data is not greater than the defined maximum amount of change threshold level. As a result, illustrative embodiments provide a technical effect of being able to determine when an anomaly does not exist in a network.

Further, the method analyzes operational time series data corresponding to a first number of hops and a first average travel time of a first plurality of data packets traversing the network from source devices to destination devices over a given time epoch using a set of Kalman filters. As a result, illustrative embodiments provide a technical effect of using Kalman filters to analyze operational time series data corresponding to number of hops and average travel time of data packets traversing a network from source devices to destination devices over a given time epoch for comparison purposes.

Furthermore, the method generates the aggregate representational error data that indicate the expected network behavior for the network regarding the data packet number of hops and average travel time in the network to detect network anomalies based on analyzing the operational time series data corresponding to the first number of hops and the first average travel time of the first plurality of data packets traversing the network from the source devices to the destination devices over the given time epoch using the set of Kalman filters. As a result, illustrative embodiments provide a technical effect of being able to generate aggregate representational error data that indicate expected network behavior for a network regarding data packet number of hops and average travel time in the network to detect network anomalies based on using Kalman filters to analyze operational time series data corresponding to number of hops and average travel time of data packets traversing the network from source devices to destination devices over the given time epoch.

Moreover, the method determines a second number of hops and a second average travel time of a second plurality of data packets traversing the network at a plurality of different time points for each respective device in the network. As a result, illustrative embodiments provide a technical effect of being able to determine number of hops and average travel time of data packets traversing a network at a plurality of different time points for each respective device in the network for comparison purposes.

The method also generates the number of hops data and the average travel time data that indicate any changes in the data packet number of hops and average travel time in the network based on the second number of hops and the second average travel time of the second plurality of data packets traversing the network at the plurality of different time points for each respective device in the network. The method compares the aggregate representational error data that indicate expected network behavior for the network regarding the data packet number of hops and average travel time in the network with the number of hops data and the average travel time data that indicate any changes in the data packet number of hops and average travel time in the network. As a result, illustrative embodiments provide a technical effect of comparing aggregate representational error data that indicate expected network behavior for a network regarding data packet number of hops and average travel time in the network with number of hops data and average travel time data that indicate any changes in the data packet number of hops and average travel time in the network to detect network anomalies.

A computer system comprises a processor set, one or more computer-readable storage media, and program instructions stored on the one or more computer-readable storage media to cause the processor set to perform operations. The computer system determines an amount of change between aggregate representational error data for a network and number of hops data and average travel time data based on comparing the aggregate representational error data that indicate expected network behavior for the network regarding data packet number of hops and average travel time in the network with the number of hops data and the average travel time data that indicate any changes in the data packet number of hops and average travel time in the network. The computer system determines whether the amount of change between the aggregate representational error data for the network and at least one of the number of hops data and the average travel time data is greater than a defined maximum amount of change threshold level. In response to determining that the amount of change between the aggregate representational error data for the network and at least one of the number of hops data and the average travel time data is greater than the defined maximum amount of change threshold level, the computer system detects that an anomaly exists in the network. As a result, illustrative embodiments provide a technical effect of increasing network security by detecting network anomalies via continually evaluating a network for ever-changing metrics corresponding to number of hops and average travel time that data packets take to traverse the network from source to destination to identify the network anomalies indicating network security risks.

Also, the computer system determines that there is a security risk to the network based on the anomaly and performs a set of action steps to mitigate the security risk to the network. As a result, illustrative embodiments provide a technical effect of increasing network security by performing a set of action steps to mitigate a security risk to a network caused by a network anomaly.

In addition, the computer system determines that no anomaly exists in the network in response to determining that the amount of change between the aggregate representational error data for the network and the number of hops data and the average travel time data is not greater than the defined maximum amount of change threshold level. As a result, illustrative embodiments provide a technical effect of being able to determine when an anomaly does not exist in a network.

Further, the computer system analyzes operational time series data corresponding to a first number of hops and a first average travel time of a first plurality of data packets traversing the network from source devices to destination devices over a given time epoch using a set of Kalman filters. As a result, illustrative embodiments provide a technical effect of using Kalman filters to analyze operational time series data corresponding to number of hops and average travel time of data packets traversing a network from source devices to destination devices over a given time epoch for comparison purposes.

Furthermore, the computer system generates the aggregate representational error data that indicate the expected network behavior for the network regarding the data packet number of hops and average travel time in the network to detect network anomalies based on analyzing the operational time series data corresponding to the first number of hops and the first average travel time of the first plurality of data packets traversing the network from the source devices to the destination devices over the given time epoch using the set of Kalman filters. As a result, illustrative embodiments provide a technical effect of being able to generate aggregate representational error data that indicate expected network behavior for a network regarding data packet number of hops and average travel time in the network to detect network anomalies based on using Kalman filters to analyze operational time series data corresponding to number of hops and average travel time of data packets traversing the network from source devices to destination devices over the given time epoch.

Moreover, the computer system determines a second number of hops and a second average travel time of a second plurality of data packets traversing the network at a plurality of different time points for each respective device in the network. The computer system generates the number of hops data and the average travel time data that indicate any changes in the data packet number of hops and average travel time in the network based on the second number of hops and the second average travel time of the second plurality of data packets traversing the network at the plurality of different time points for each respective device in the network. The computer system compares the aggregate representational error data that indicate expected network behavior for the network regarding the data packet number of hops and average travel time in the network with the number of hops data and the average travel time data that indicate any changes in the data packet number of hops and average travel time in the network. As a result, illustrative embodiments provide a technical effect of comparing aggregate representational error data that indicate expected network behavior for a network regarding data packet number of hops and average travel time in the network with number of hops data and average travel time data that indicate any changes in the data packet number of hops and average travel time in the network to detect network anomalies.

A computer program product comprises one or more computer-readable storage media and program instructions stored on the one or more computer-readable storage media to perform operations. The computer program product determines an amount of change between aggregate representational error data for a network and number of hops data and average travel time data based on comparing the aggregate representational error data that indicate expected network behavior for the network regarding data packet number of hops and average travel time in the network with the number of hops data and the average travel time data that indicate any changes in the data packet number of hops and average travel time in the network. The computer program product determines whether the amount of change between the aggregate representational error data for the network and at least one of the number of hops data and the average travel time data is greater than a defined maximum amount of change threshold level. In response to determining that the amount of change between the aggregate representational error data for the network and at least one of the number of hops data and the average travel time data is greater than the defined maximum amount of change threshold level, the computer program product detects that an anomaly exists in the network. As a result, illustrative embodiments provide a technical effect of increasing network security by detecting network anomalies via continually evaluating a network for ever-changing metrics corresponding to number of hops and average travel time that data packets take to traverse the network from source to destination to identify the network anomalies indicating network security risks.

Also, the computer program product determines that there is a security risk to the network based on the anomaly and performs a set of action steps to mitigate the security risk to the network. As a result, illustrative embodiments provide a technical effect of increasing network security by performing a set of action steps to mitigate a security risk to a network caused by a network anomaly.

In addition, the computer program product determines that no anomaly exists in the network in response to determining that the amount of change between the aggregate representational error data for the network and the number of hops data and the average travel time data is not greater than the defined maximum amount of change threshold level. As a result, illustrative embodiments provide a technical effect of being able to determine when an anomaly does not exist in a network.

Further, the computer program product analyzes operational time series data corresponding to a first number of hops and a first average travel time of a first plurality of data packets traversing the network from source devices to destination devices over a given time epoch using a set of Kalman filters. As a result, illustrative embodiments provide a technical effect of using Kalman filters to analyze operational time series data corresponding to number of hops and average travel time of data packets traversing a network from source devices to destination devices over a given time epoch for comparison purposes.

Furthermore, the computer program product generates the aggregate representational error data that indicate the expected network behavior for the network regarding the data packet number of hops and average travel time in the network to detect network anomalies based on analyzing the operational time series data corresponding to the first number of hops and the first average travel time of the first plurality of data packets traversing the network from the source devices to the destination devices over the given time epoch using the set of Kalman filters. As a result, illustrative embodiments provide a technical effect of being able to generate aggregate representational error data that indicate expected network behavior for a network regarding data packet number of hops and average travel time in the network to detect network anomalies based on using Kalman filters to analyze operational time series data corresponding to number of hops and average travel time of data packets traversing the network from source devices to destination devices over the given time epoch.

Moreover, the computer program product determines a second number of hops and a second average travel time of a second plurality of data packets traversing the network at a plurality of different time points for each respective device in the network. As a result, illustrative embodiments provide a technical effect of being able to determine number of hops and average travel time of data packets traversing a network at a plurality of different time points for each respective device in the network for comparison purposes.

The computer program product also generates the number of hops data and the average travel time data that indicate any changes in the data packet number of hops and average travel time in the network based on the second number of hops and the second average travel time of the second plurality of data packets traversing the network at the plurality of different time points for each respective device in the network. The computer program product compares the aggregate representational error data that indicate expected network behavior for the network regarding the data packet number of hops and average travel time in the network with the number of hops data and the average travel time data that indicate any changes in the data packet number of hops and average travel time in the network. As a result, illustrative embodiments provide a technical effect of comparing aggregate representational error data that indicate expected network behavior for a network regarding data packet number of hops and average travel time in the network with number of hops data and average travel time data that indicate any changes in the data packet number of hops and average travel time in the network to detect network anomalies.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A CPP embodiment is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a wave-guide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to the environments in which different embodiments may be implemented. Many modifications to the depicted environment may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as network anomaly detection code 200. For example, network anomaly detection code 200 continually evaluates a network for ever-changing metrics corresponding to number of hops and average travel time that data packets take to traverse the network from source to destination to identify network anomalies indicating network security risks.

In addition to network anomaly detection code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and network anomaly detection code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in network anomaly detection code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the network anomaly detection services provided by computer 101), and may take any of the forms discussed above in connection with computer 101. EUD 103 typically receives helpful and useful data from the operations of computer 101. For example, in a hypothetical case where computer 101 is designed to provide a network anomaly detection notification to the end user, this notification would typically be communicated from network module 115 of computer 101 through WAN 102 to EUD 103. In this way, EUD 103 can display, or otherwise present, the network anomaly detection notification to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a network anomaly detection notification based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In networks when a message, which is decomposed into data packets, needs to be sent from one device (e.g., source device) to another device (e.g., destination device), multiple paths through the networks can be taken. Network components, such as, for example, switches, routers, and the like, along with the configuration data of these network components, determine which path the data packets take from the source device to the destination device. The network components base this determination on multiple factors that include, for example, the number of hops from source to destination and the time it takes for a data packet to reach the destination from the source. Normally, once the network components establish a path through the network between a pair of source and destination devices, all future data packets should follow the same path. Moreover, the time a data packet takes to traverse the path through the network from source to destination, which is defined as average age herein, should not vary by an appreciable amount.

However, in certain situations, an authorized user may connect an unauthorized device to the network and send anomalous traffic (e.g., anomalous data packets) to a destination device that may not follow a typical path through the network to the destination device. As a result, the number of hops and the time taken by the anomalous traffic through the network to the destination device will vary. Thus, a need exists to detect anomalous traffic based on the number of hops a data packet takes to reach the destination and the average time the data packet takes to traverse the network to the destination.

Current solutions that have an ability to detect anomalous traffic work at the network level by installing a plurality of agents throughout the network. However, these current solutions have issues. For example, these current solutions need access to the entire network, which increases the security risk to and operational complexity of the network.

Illustrative embodiments analyze the number of hops and the average travel time a data packet takes to traverse a network from source to destination. It should be noted that illustrative embodiments can be utilized for any type of network that connects devices together for transferring data or messages. Illustrative embodiments continually evaluate the network for ever-changing metrics corresponding to the number of hops and average travel time a data packet takes to traverse a network from source to destination.

As a result, illustrative embodiments develop sensitivity to individual metric changes (e.g., changes in the number of hops and average travel time) over a given time epoch to detect any anomalous traffic, device, or pathway in the network to increase network security by decreasing network risk. For example, if illustrative embodiments determine that the number of hops or the average travel time a data packet takes through the network increases significantly, then illustrative embodiments determine that an anomalous situation exists within the network and take a set of action steps to mitigate or decrease the security risk to the network. In addition, if illustrative embodiments determine that the number of devices connected to the network increases significantly, then illustrative embodiments detect that an anomalous situation exists and automatically close connections corresponding to identified anomalous devices within the network.

Once a path is established between a specific source device and a specific destination device within the network, the number of hops a data packet takes will be the same most of the time, but there can be deviations in the number of hops at different times. In addition, sometimes a decrease in the number of hops can lead to an increase in the average travel time that a data packet takes to traverse the network. As a result, the average data packet travel time can also vary at times. Thus, a one-to-one correlation between the number of hops and average travel time that a data packet takes through the network cannot be made. Therefore, illustrative embodiments continually identify the ever-changing relationship between the number of hops and average travel time a data packet takes through the network in order to detect any anomalies (e.g., traffic, devices, or pathways), without depending on deploying agents throughout the network.

For example, illustrative embodiments determine the representational error of the network using time series values for the number of hops and average travel time of a data packet traversing the network from source to destination. Illustrative embodiments aggregate or accumulate the representational error of the network in a representational error data sink by decoupling the devices (e.g., observing each device in the network separately and individually) within the network. Illustrative embodiments identify network anomalies using hypothesis-based insights for individual devices based on average travel time (e.g., average age) of a data packet in terms of number of hops taken within the network to reach that particular destination device.

Illustrative embodiments encode operational time series data (e.g., timestamps) for metrics (e.g., number of hops and average travel time) in the aggregate representational error of the network, such that illustrative embodiments can decode the operational time series data for the metrics at the destination device using different decoupling devices near the destination device. It should be noted that illustrative embodiments utilize, for example, a Kalman filter to identify a stream of metrics over a given time epoch. The destination device and decoupling devices are emancipated devices within the network.

The decoupling devices represent specific operational time series data corresponding to a given metric. One metric is the number of hops a source device uses to send a data packet to a destination device. As a result, the corresponding operational time series data that illustrative embodiments receive only have an understanding of how the number of hops has changed or evolved within the network over a given time epoch for a device, which illustrative embodiments represent as:

$$E[P^i(k)]_{hops}.$$

Illustrative embodiments then represent the aggregate representational error as $e^{\xi}$. Illustrative embodiments retrieve the aggregate representational error from the representational error data sink, $\partial^A(k)$, which indexes multiple metrics by j=B . . . N. However, for the purpose of anomaly detection, illustrative embodiments are only interested in the number of hops. Illustrative embodiments represent the above by defining $\partial^A(k)$ as the network available for the representational error data sink at the k frame of distribution as follows:

$$\left\{P^i(k\,|\,k) \triangleq \partial^A(k) - \partial^j(k\,|\,k)\right\}_{\substack{j=B\,\ldots\,N \\ i=A,j}}. \quad \text{Eq (1)}$$

When there is no failure (e.g., when metric values are the same or similar to expected metric values), all the state estimates from all Kalman filters are unbiased indicating no anomaly; else illustrative embodiments detect an anomaly within the network. For example, illustrative embodiments utilize the following:

$$E[P^i(k)] \triangleq E[\partial^A(k\,|\,k)] - E[\partial^j(k\,|\,k)] = e^{\xi}. \quad \text{Eq (2)}$$

Illustrative embodiments develop sensitivity to individual metric changes using the following:

$$E[P^i(k)]_{hops} \triangleq \{E[\partial^A(k\,|\,k)] - E[\partial^j(k\,|\,k)]\}_{j=4} = \xi_{hops}. \quad \text{Eq (3)}$$

where $\xi_{hops}$ represents the aggregate representational error of the network that is sensitive to the number of hops changing over a given time epoch across all devices in the network. Illustrative embodiments determine the number of hops as an average number of hops. Illustrative embodiments manifest the sensitivity to the number of hops changing over a given time epoch by utilizing an array of Kalman filters. For example, in the equation above, j=4 is specific to a particular Kalman filter that is processing the sensitivity towards the average number of hops and is the fourth filter in the array of Kalman filters.

Consider a destination device and a source device as a communication pair in the network. Let $$t_k^{epoch}$$

be the times at which illustrative embodiments receive metric updates from the destination device. At the current time å, the index number of the most recent metric update for the window of data packet transmission selected is:

$$N(å) = \{\max\{k\,|\,t_k^{epoch} < å\}\}_{window}. \quad \text{Eq (4)}$$

where the timestamp of the most recent metric update is:

$$å_{current} = t.\ \text{average}(N(å)). \quad \text{Eq (5)}$$

Illustrative embodiments also calculate the average age or average travel time of a data packet till destination. Calculating the average age of a data packet till destination is a stochastic process, which is ergodic. For example, a stochastic process is characterized as ergodic when the collective average of an observable sample equals the time average. In such a case, any collection of random samples from the stochastic process represents the average statistical properties of the entire process. As a result, illustrative embodiments can calculate the average age of a data packet using a time average.

Assume an observation period (e.g., a given time epoch) of (0, T). Illustrative embodiments calculate the average age of a data packet from source to destination as:

$$\Delta T = \frac{1}{T}\int_0^T \Delta(t)\cdot dt. \quad \text{Eq (6)}$$

Taking the length of the observation period "T" to infinity, the equation for the average age of a data packet till destination is:

$$\left\{\Delta_{Average-age} = \frac{E[Y * T] + \frac{E[Y^2]}{2}}{E[Y]}\right\}_{E[Y]=\frac{1}{\lambda}}. \quad \text{Eq (7)}$$

where $\lambda$ is the steady state rate of generating timestamp updates on the data packet till destination.

Illustrative embodiments perform a hypothesis-based evaluation to detect anomalies in the network. For example, because illustrative embodiments utilize $\theta_{average-age}$ to represent the time series for the average age of a data packet till destination issued within the network from a source device, illustrative embodiments utilize the following:

$$H1: \langle E[\{\xi_{hops} - E[\xi_{hops}]\}\{\Delta_{Average-age} - E[\Delta_{Average-age}]\}] >> 0\rangle. \quad \text{Eq (8)}$$

where H1 represents the hypothesis that the change in the number of hops and/or the change in the corresponding average time travel of a data packet from source to destination within the network is not expected network behavior based on the aggregate representational error of the network. If H1 evaluates to true (i.e., if H1 is much greater than zero), then illustrative embodiments determine that an anomaly exists in the network (e.g., anomalous traffic, device, or path exists in the network) and perform a set of action steps to mitigate the security risk to the network.

Thus, illustrative embodiments provide one or more technical solutions that overcome a technical problem with current network security solutions increasing security risk to and operational complexity of networks by accessing and installing a plurality of agents throughout the networks. As a result, these one or more technical solutions provide a technical effect and practical application in the field of network security.

Figure 2:
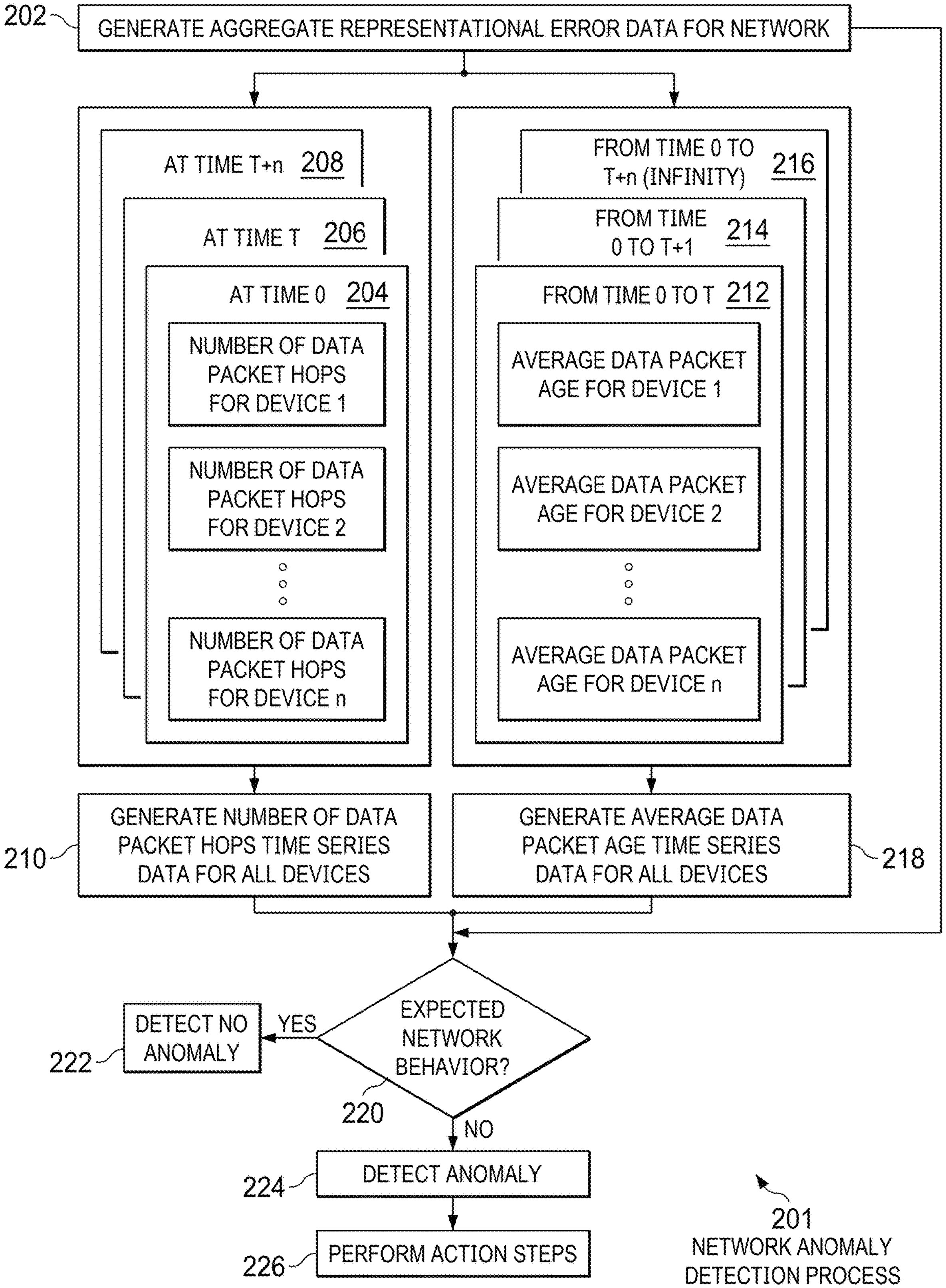
FIG. 2 is a diagram illustrating an example of a network anomaly detection process in accordance with an illustrative embodiment.

With reference now to FIG. 2, a diagram illustrating an example of a network anomaly detection process is depicted in accordance with an illustrative embodiment. Network anomaly detection process 201 may be implemented in a computer, such as computer 101 in FIG. 1. For example, network anomaly detection process 201 may be implemented by network anomaly detection code 200 in FIG. 1.

In this example, at 202, the computer generates aggregate representational error data for a network, such as WAN 102 in FIG. 1. The aggregate representational error data indicate expected network behavior for the network regarding number of hops and average travel time of data packets in the network. The computer uses the aggregate representational error data to detect anomalies in the network. The computer generates the aggregate representational error data by analyzing operational time series data corresponding to the number of hops and the average travel time of the data packets traversing the network from source to destination over a given time epoch using Kalman filters. The computer receives timestamped information regarding data packet number of hops and average travel time from respective destination devices within the network at defined intervals.

At 204, the computer receives number of data packet hops for devices 1 through "n" at time 0, where n can represent any number. At 206, the computer receives number of data packet hops for devices 1 through n at time T. At 208, the computer receives number of data packet hops for devices 1 through n at time T+n. At 210, the computer generates number of data packet hops time series data for all devices (e.g., devices 1 through n) based on the information received at 204, 206, and 208.

At 212, the computer also receives average data packet age (e.g., travel time) for devices 1 through n from time 0 to T. At 214, the computer receives average data packet age for devices 1 through n from time 0 to T+1. At 216, the computer receives average data packet age for devices 1 through n from time 0 to T+n (e.g., going toward infinity). At 218, the computer generates average data packet age time series data for all devices (e.g., devices 1 through n) based on the information received at 212, 214, and 216. It should be noted that the computer may perform 204-210 and 212-218 concurrently.

At 220, the computer determines whether the network is behaving as expected based on comparing the aggregate representational error data for the network with the number of data packet hops time series data and average data packet age time series data generated for all devices. At 222, if the computer determines that the network is behaving as expected, then the computer detects that no anomaly exists in the network. Conversely, at 224, if the computer determines that the network is not behaving as expected, then the computer detects that an anomaly exists in the network. At 226, in response to detecting the anomaly, the computer performs action steps to mitigate security risk to the network caused by the anomaly. The action steps include, for example, sending a network anomaly detected notification to a system administrator, identifying a network connection corresponding to the anomaly, tracing the network connection corresponding to the anomaly to an anomalous device, terminating the network connection to the anomalous device, reporting the anomaly and the anomalous device to a network security system for analysis and future reference, and the like.

Figure 3A:
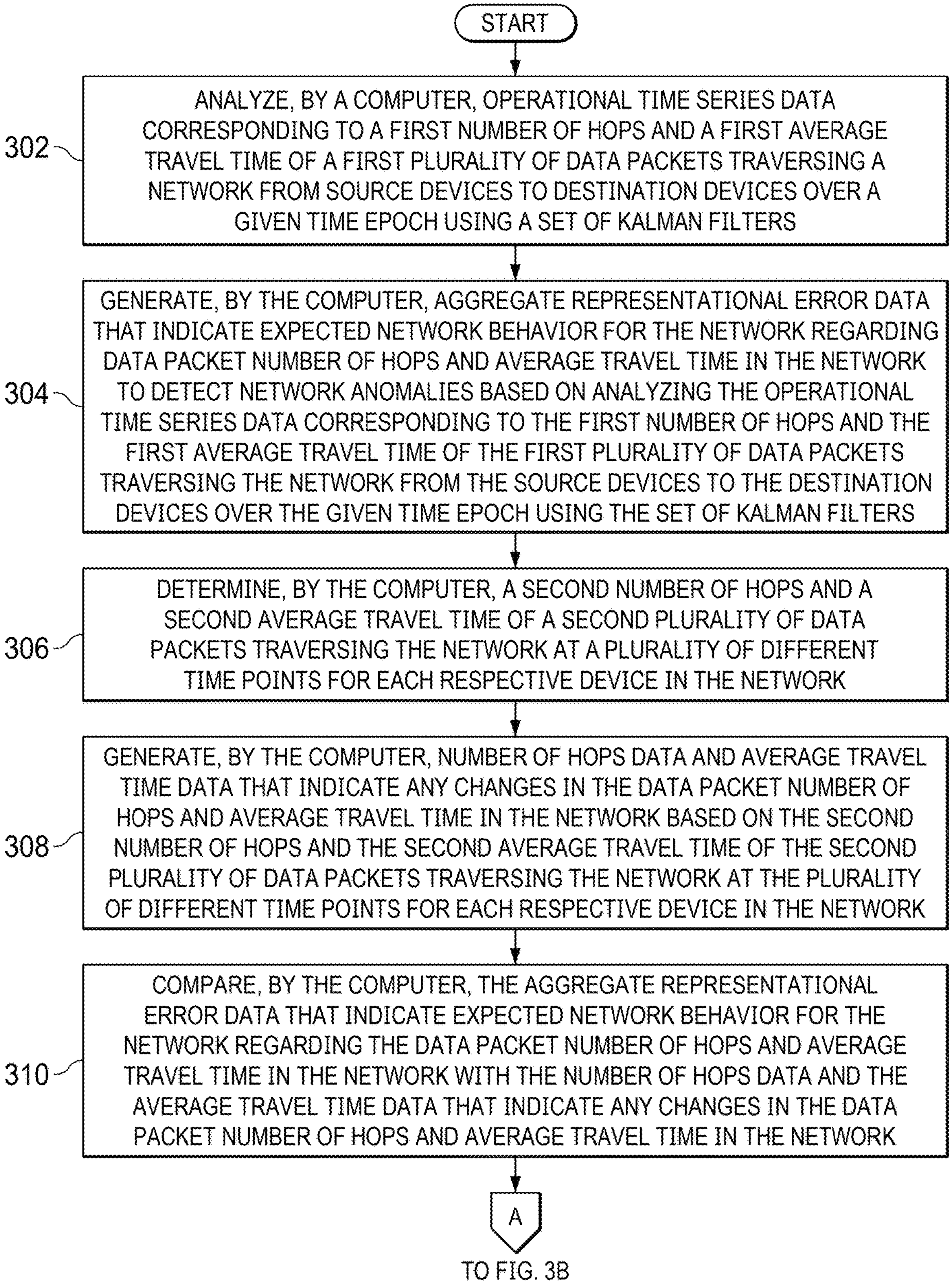
FIGS. 3A-3B are a flowchart illustrating a process for detecting network anomalies in accordance with an illustrative embodiment.
Figure 3B:
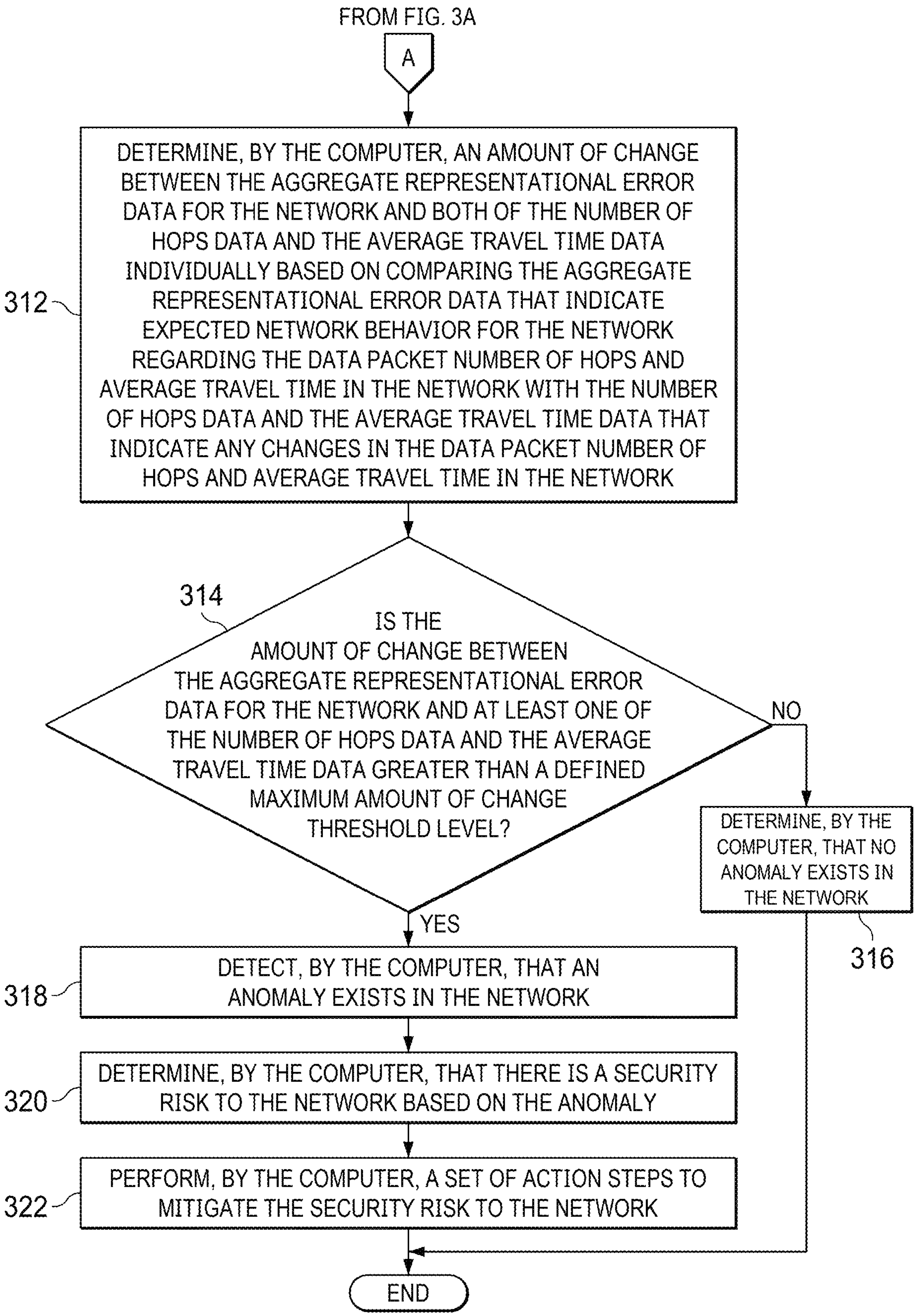

With reference now to FIGS. 3A-3B, a flowchart illustrating a process for detecting network anomalies is shown in accordance with an illustrative embodiment. The process shown in FIGS. 3A-3B may be implemented in a computer, such as, for example, computer 101 in FIG. 1. For example, the process shown in FIGS. 3A-3B may be implemented by network anomaly detection code 200 in FIG. 1.

The process begins when the computer analyzes operational time series data corresponding to a first number of hops and a first average travel time of a first plurality of data packets traversing a network from source devices to destination devices over a given time epoch using a set of Kalman filters (step 302). The computer generates aggregate representational error data that indicate expected network behavior for the network regarding data packet number of hops and average travel time in the network to detect network anomalies based on analyzing the operational time series data corresponding to the first number of hops and the first average travel time of the first plurality of data packets traversing the network from the source devices to the destination devices over the given time epoch using the set of Kalman filters (step 304).

The computer also determines a second number of hops and a second average travel time of a second plurality of data packets traversing the network at a plurality of different time points for each respective device in the network (step 306). The computer generates number of hops data and average travel time data that indicate any changes in the data packet number of hops and average travel time in the network based on the second number of hops and the second average travel time of the second plurality of data packets traversing the network at the plurality of different time points for each respective device in the network (step 308).

The computer compares the aggregate representational error data that indicate expected network behavior for the network regarding the data packet number of hops and average travel time in the network with the number of hops data and the average travel time data that indicate any changes in the data packet number of hops and average travel time in the network (step 310). The computer determines an amount of change between the aggregate representational error data for the network and both of the number of hops data and the average travel time data individually based on comparing the aggregate representational error data that indicate expected network behavior for the network regarding the data packet number of hops and average travel time in the network with the number of hops data and the average travel time data that indicate any changes in the data packet number of hops and average travel time in the network (step 312).

Afterward, the computer makes a determination as to whether the amount of change between the aggregate representational error data for the network and at least one of the number of hops data and the average travel time data is greater than or equal to a defined maximum amount of change threshold level (step 314). If the computer determines that the amount of change between the aggregate representational error data for the network and both of the number of hops data and the average travel time data is not greater than or equal to the defined maximum amount of change threshold level, no output of step 314, then the computer determines that no anomaly exists in the network (step 316). Thereafter, the process terminates.

If the computer determines that the amount of change between the aggregate representational error data for the network and at least one of the number of hops data and the average travel time data is greater than or equal to the defined maximum amount of change threshold level, yes output of step 314, then the computer detects that an anomaly exists in the network (step 318). The computer determines that there is a security risk to the network based on the anomaly (step 320). The computer performs a set of action steps to mitigate the security risk to the network (step 322). Thereafter, the process terminates.

Thus, illustrative embodiments of the present disclosure provide a computer-implemented method, computer system, and computer program product for detecting network anomalies to increase network security. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

analyzing operational time series data corresponding to a first number of hops and a first average travel time of a first plurality of data packets traversing a network from source devices to destination devices over a given time epoch using a set of Kalman filters;

generating aggregate representational error data that indicate expected network behavior for the network regarding data packet number of hops and average travel time in the network based on analyzing the operational time series data using the set of Kalman filters;

determining an amount of change between the aggregate representational error data for the network and number of hops data and average travel time data based on comparing the aggregate representational error data that indicate expected network behavior for the network regarding the data packet number of hops and average travel time in the network with the number of hops data and the average travel time data that indicate any changes in the data packet number of hops and average travel time in the network;

determining whether the amount of change between the aggregate representational error data for the network and at least one of the number of hops data and the average travel time data is greater than a defined maximum amount of change threshold level; and responsive to determining that the amount of change between the aggregate representational error data for the network and at least one of the number of hops data and the average travel time data is greater than the defined maximum amount of change threshold level, detecting that an anomaly exists in the network.

2. The method of claim 1, further comprising:

determining that there is a security risk to the network based on the anomaly; and performing a set of action steps to mitigate the security risk to the network.

3. The method of claim 1, further comprising:

responsive to determining that the amount of change between the aggregate representational error data for the network and the number of hops data and the average travel time data is not greater than the defined maximum amount of change threshold level, determining that no anomaly exists in the network.

4. The method of claim 1, further comprising:

determining a second number of hops and a second average travel time of a second plurality of data packets traversing the network at a plurality of different time points for each respective device in the network.

5. The method of claim 4, further comprising:

generating the number of hops data and the average travel time data that indicate any changes in the data packet number of hops and the average travel time in the network based on the second number of hops and the second average travel time of the second plurality of data packets traversing the network at the plurality of different time points for each respective device in the network; and comparing the aggregate representational error data that indicate expected network behavior for the network regarding the data packet number of hops and the average travel time in the network with the number of hops data and the average travel time data that indicate any changes in the data packet number of hops and the average travel time in the network.

6. The method of claim 1, wherein the analyzing operational time series data corresponding to the first number of hops and the first average travel time using the set of Kalman filters comprises:

manifesting sensitivity to the number of hops changing over the given time epoch by utilizing an array of Kalman filters, wherein the array of Kalman filters develops sensitivity to individual metric changes over the given time epoch across devices in the network.

7. The method of claim 1, wherein generating the aggregate representational error data comprises:

aggregating or accumulating representational error of the network in a representational error data sink by decoupling devices within the network, including observing each device in the network separately and individually, wherein the aggregate representational error data represent expected network behavior for the network regarding the data packet number of hops and the average travel time in the network.

8. A computer system comprising:

a processor set;

one or more computer-readable storage media; and program instructions stored on the one or more computer-readable storage media to cause the processor set to perform operations comprising:

analyzing operational time series data corresponding to a first number of hops and a first average travel time of a first plurality of data packets traversing a network from source devices to destination devices over a given time epoch using a set of Kalman filters;

generating aggregate representational error data that indicate expected network behavior for the network regarding data packet number of hops and average travel time in the network based on analyzing the operational time series data using the set of Kalman filters;

determining an amount of change between the aggregate representational error data for the network and number of hops data and average travel time data based on comparing the aggregate representational error data that indicate expected network behavior for the network regarding the data packet number of hops and average travel time in the network with the number of hops data and the average travel time data that indicate any changes in the data packet number of hops and average travel time in the network;

determining whether the amount of change between the aggregate representational error data for the network and at least one of the number of hops data and the average travel time data is greater than a defined maximum amount of change threshold level; and responsive to determining that the amount of change between the aggregate representational error data for the network and at least one of the number of hops data and the average travel time data is greater than the defined maximum amount of change threshold level, detecting that an anomaly exists in the network.

9. The computer system of claim 8, wherein the operations further comprise:

determining that there is a security risk to the network based on the anomaly; and performing a set of action steps to mitigate the security risk to the network.

10. The computer system of claim 8, wherein the operations further comprise:

responsive to determining that the amount of change between the aggregate representational error data for the network and the number of hops data and the average travel time data is not greater than the defined maximum amount of change threshold level, determining that no anomaly exists in the network.

11. The computer system of claim 8, wherein the operations further comprise:

determining a second number of hops and a second average travel time of a second plurality of data packets traversing the network at a plurality of different time points for each respective device in the network;

generating the number of hops data and the average travel time data that indicate any changes in the data packet number of hops and the average travel time in the network based on the second number of hops and the second average travel time of the second plurality of data packets traversing the network at the plurality of different time points for each respective device in the network; and comparing the aggregate representational error data that indicate expected network behavior for the network regarding the data packet number of hops and the average travel time in the network with the number of hops data and the average travel time data that indicate any changes in the data packet number of hops and the average travel time in the network.

12. The computer system of claim 8, wherein the analyzing operational time series data corresponding to the first number of hops and the first average travel time using the set of Kalman filters comprises:

manifesting sensitivity to the number of hops changing over the given time epoch by utilizing an array of Kalman filters, wherein the array of Kalman filters develops sensitivity to individual metric changes over the given time epoch across devices in the network.

13. The computer system of claim 8, wherein generating the aggregate representational error data comprises:

aggregating or accumulating representational error of the network in a representational error data sink by decoupling devices within the network, including observing each device in the network separately and individually, wherein the aggregate representational error data represent expected network behavior for the network regarding the data packet number of hops and the average travel time in the network.

14. A computer program product comprising:

one or more computer-readable storage media; and program instructions stored on the one or more computer-readable storage media to perform operations comprising:

analyzing operational time series data corresponding to a first number of hops and a first average travel time of a first plurality of data packets traversing a network from source devices to destination devices over a given time epoch using a set of Kalman filters;

generating aggregate representational error data that indicate expected network behavior for the network regarding data packet number of hops and average travel time in the network based on analyzing the operational time series data using the set of Kalman filters;

determining an amount of change between the aggregate representational error data for the network and number of hops data and average travel time data based on comparing the aggregate representational error data that indicate expected network behavior for the network regarding the data packet number of hops and average travel time in the network with the number of hops data and the average travel time data that indicate any changes in the data packet number of hops and average travel time in the network;

determining whether the amount of change between the aggregate representational error data for the network and at least one of the number of hops data and the average travel time data is greater than a defined maximum amount of change threshold level; and responsive to determining that the amount of change between the aggregate representational error data for the network and at least one of the number of hops data and the average travel time data is greater than the defined maximum amount of change threshold level, detecting that an anomaly exists in the network.

15. The computer program product of claim 14, wherein the operations further comprise:

determining that there is a security risk to the network based on the anomaly; and performing a set of action steps to mitigate the security risk to the network.

16. The computer program product of claim 14, wherein the operations further comprise:

responsive to determining that the amount of change between the aggregate representational error data for the network and the number of hops data and the average travel time data is not greater than the defined maximum amount of change threshold level, determining that no anomaly exists in the network.

17. The computer program product of claim 14, wherein the operations further comprise:

determining a second number of hops and a second average travel time of a second plurality of data packets traversing the network at a plurality of different time points for each respective device in the network.

18. The computer program product of claim 17, wherein the operations further comprise:

generating the number of hops data and the average travel time data that indicate any changes in the data packet number of hops and the average travel time in the network based on the second number of hops and the second average travel time of the second plurality of data packets traversing the network at the plurality of different time points for each respective device in the network; and comparing the aggregate representational error data that indicate expected network behavior for the network regarding the data packet number of hops and the average travel time in the network with the number of hops data and the average travel time data that indicate any changes in the data packet number of hops and the average travel time in the network.

19. The computer program product of claim 14, wherein the analyzing operational time series data corresponding to the first number of hops and the first average travel time using the set of Kalman filters comprises:

manifesting sensitivity to the number of hops changing over the given time epoch by utilizing an array of Kalman filters, wherein the array of Kalman filters develops sensitivity to individual metric changes over the given time epoch across devices in the network.

20. The computer program product of claim 14, wherein generating the aggregate representational error data comprises:

aggregating or accumulating representational error of the network in a representational error data sink by decoupling devices within the network, including observing each device in the network separately and individually, wherein the aggregate representational error data represent expected network behavior for the network regarding the data packet number of hops and the average travel time in the network.

* * * * *